United States Patent Office 3,260,589
Patented July 12, 1966

3,260,589
METHOD OF WEED CONTROL
Robert H. Salvesen, Clark, N.J., assignor to Esso Research and Engineering Company, a corporation of Delaware
No Drawing. Filed Mar. 12, 1962, Ser. No. 179,192
The portion of the term of the patent subsequent to Oct. 27, 1981, has been disclaimed
1 Claim. (Cl. 71—2.6)

This invention relates to an aryloxy-type, selective herbicide in a petroleum wax formulation which is useful for better weed control and less crop injury, particularly when used on wheat and barley crops.

The aryloxy compounds with which this invention is concerned are those compounds which contain two to three chlorine substituents in the aryloxy group which is joined to an alkanoic acid radical, such as acetic acid or propionic acid, and with ester derivatives of these compounds. The compound 2,4-dichlorophenoxy acetic acid, its ester derivatives, and the compounds 2-(2,4,5)-trichlorophenoxy acetic acid or propionic acid and their derivatives are the herbicides which are of particular interest with respect to the present invention. Principally, the relatively low volatility ester derivatives, such as butoxy ethanol, propylene glycol monobutyl ether, and isooctyl alcohol esters of 2-(2,4,5)-trichlorophenoxy propionic acid are of high value for weed control on grain crops, such as wheat or barley, since these compounds are harmless to animals when present in low concentrations on the food crops.

Currently available formulations of the aryloxy herbicides have used a certain variety of liquid organic solvents to make spray solutions or emulsions. Among the organic solvents which have been proposed for these herbicides are kerosene, Stoddard solvent, aromatic hydrocarbons and chlorinated hydrocarbons. Some of these liquid organic solvents are not suitable for dissolving some of the herbicide compositions. The oil solvents have been found to add to the herbicidal strength in killing weeds and also in killing some of the sensitive cultivated crops.

Now, in accordance with the present invention, the aryloxy herbicides of interest are made more effective toward objectionable weeds when used in comparatively low concentrations and give less crop injury if these herbicides are dissolved in a petroleum wax which is then dispersed with dispersing agents in water and homogenized to a low particle size of about 0.5 to 100 microns, preferably less than 10 microns. The wax suspension formulations are made by melting a petroleum paraffin wax, principally composed of paraffinic hydrocarbons and having a melting point in the range of 120° to 150° F., then admixing with stirring the aryloxy herbicide which is compatible with the wax for dissolving it therein. To the wax-aryloxy solution is added a wax-soluble dispersing agent or a dispersant which can be solubilized with a solubilizing agent. In using a dispersant which is water-soluble, e.g., morpholine, it may be added to the water which is admixed with the wax solution of the aryloxy herbicide.

The mixture of the wax solution with water and with the admixed dispersing agents may then be subjected to homogenizing on a colloid mill or a homogenizer capable of comminuting the herbicide-containing wax particles to a size of about 0.5 to 100 microns, preferably 0.5 to 10 microns, so as to form a suspension of the solid particles in the water. The mixture is then allowed to cool to atmospheric or room temperature (e.g., about 70° F.) to form a white, milky, low-viscosity liquid dispersion of the solid particles of paraffin wax 0.5 to 100 microns in size.

The resulting aqueous concentrated suspension may contain about 0.2 to 6 parts, preferably 0.5 to 2 parts, by weight of wax per each part by weight of the aryloxy herbicide, depending on the control desired. The aqueous suspension concentrate may be made to contain about 30 to 70 wt. percent of water. The amount of dispersing agents used may be 1 to 10 wt. percent of the aqueous suspension concentrate. For application to control weeds, the aqueous concentrate is diluted with more water to such extent that between 20 and 200 gallons of dilute suspension contains at least ⅛ lb. of the aryloxy herbicide.

The paraffin wax ingredients may be characterized as both normal and branch chain paraffins having melting points in the range of 120° to 150° F. These waxes may be obtained by well-known commercial methods and generally include congealing of the wax solids in a distilled petroleum fraction in the boiling range of lubricating or neutral oils, and separation of the congealed wax solids from the liquid hydrocarbons as by centrifuging or filtering. The crude wax is treated to lower the oil content by sweating or deoiling with solvents. The refined paraffin wax for use according to the present invention may contain up to about 3% of oil. Paraffin wax is the crystalline product defined on pages 10–6, 10–7, and 10–8 of "Petroleum Products Handbook," published by McGraw-Hill Book Company, Inc., in 1960, Library of Congress Catalog Card Number 58–13870. Paraffin wax is distinct from microcrystalline wax and from petrolatum as recognized products in commerce.

The dispersing agents found particularly useful for obtaining the suspension of the wax-containing herbicide in water are substances that are known in the art as surfactants. These include agents known under the names of Span, Tween, Morlex and Triton. These materials include monostearate esters of sorbitan or ethoxylated sorbitan, other esters of polyhydric alcohols, polyethers, and such surface active substances which serve to hold the fine solid wax particles in suspension without leaching out the herbicide dissolved in the wax. When the dispersing agent is water-soluble, fatty acids such as stearic acid are preferably used in conjunction with the agents, the fatty acid being dissolved in the wax. Morpholine, a water-soluble dispersing agent, was used with a fatty acid in the wax to form a suspension which was faster breaking in use than when the dispersant was entirely dissolved in the wax.

For the purpose of testing spray applications of the wax suspensions, a number of wax formulations were prepared as shown in Table I.

TABLE I.—WAX FORMULATIONS CONTAINING ARYLOXY HERBICIDE

[Herbicide: Propylene glycol monobutyl ether ester of 2-(2,4,5)-trichlorophenoxy propionic acid]

| Composition, Wt. percent: | | |
|---|---|---|
| Herbicide | 35.2 | 35.2 |
| Paraffin Wax (130° F. Melting Point) | 20.0 | 20.0 |
| Span 60 (sorbitan monostearate) | 2.0 | |
| Tween 60 (polyethoxy sorbitan monostearate) | 2.0 | |
| Stearic Acid | | 1.5 |
| Morpholine | | 3.0 |
| Triton X–45 (isooctyl phenyl polyethoxy ethanol) | | 0.75 |
| Triton B–1956 (modified phthalic glycerol alkyd resin) | 0.15 | 0.15 |
| Water | 43.65 | 44.4 |
| pH | 4.9 | 9.8 |

In the preparation of the desired suspensions of solid wax particles containing the dissolved herbicide, ingredients and processing steps are used which avoid forming a gel or liquid-in-liquid emulsion. Therefore, fats or oils which are fatty esters that tend to absorb water are not present in any significant amount, such as to cause water absorption or gelling of the paraffin wax particles. The procedure for preparing a wax suspension using formulations such as shown in Table I is as follows.

The wax is heated to 10° to 20° F. above its melting point in a suitable container. To the molten wax is added the desired herbicide and wax-soluble dispersing agents. This mixture generally forms a homogeneous liquid, and this then added to water which has been heated to about 140° to 160° F. and may contain one or more water-soluble dispersants, such as morpholine. The wax solution is added to the aqueous phase to assure formation of an "oil-in-water" dispersion rather than an invert system. The above components are mixed in a colloid mill or other suitable homogenizing equipment for 2 to 60 minutes, depending on the size of the batch, at a temperature of 10° to 20° F. above the melting point of the wax. This mixing assures a small particle size and narrow particle size distribution. The resulting mixture is then allowed to cool to room temperature.

In essence, the preferred solid paraffin wax particles are of 0.5 to 10 microns in size and contain 0.16 to 5 parts of the herbicide ester dissolved in one part by weight of the wax having a helting point in the range of 120° to 150° F. These wax particles may contain minor amounts of dispersing agents which are insoluble in water or have very low water solubility, e.g., less than about 5 parts by weight per one part by weight of the wax.

A number of wax suspensions prepared as described were given actual field test for comparison with commercially available herbicides of the same "2,4,5-T" type. Each of the formulations was diluted with water to be sprayed on wheat and barley crops at rates of ⅛, ¼, ½ and 1 lb. of active herbicide in 40 gallons of spray liquid per acre. Each application was replicated four times. The application was made after the crops were about 6 to 8 inches in height for postemergence weed control. The crops were rated at regular intervals and it was noted that the wax suspension formulations exhibited better weed control on all types of weeds and yet did not injure tht grain crop as much as the standard commercial emulsion formulations.

Of particular concern in growing wheat and barley are weeds such as dog fennel which, if uncontrolled, will practically obliterate the desired crop, or at least stunt its growth drastically. In addition to this harmful effect, even a small amount of dog fennel among wheat and barley crops will reduce the value of the harvested crops. The reason for this is that dog fennel produces a daisy-like flower which has a bad odor. On harvesting the grain crop, this "stink daisy," as it is often called, is also cut and mixed with the kernels of grain and imparts an undesirable odor and taste. Such contamination reduces the value of the crop. Since the wax suspension particle formulations are more effective against such weeds as dog fennel, this advantage is of real value. The weed control tests are summarized as follows.

In comparing the wax-suspension applications with the commercial emulsion applications at the same rate of ½ lb. of the herbicide per acre, it was noted that the emulsion gave only about 50% weed control and stunted the crops slightly. At a higher concentration of 1 lb. of the active herbicide per acre, the wax suspension formulations gave complete weed kill with no crop injury, whereas the commercial oil emulsion of the herbicide formulation gave poor control with some crop injury.

What is claimed is:

Method of postemergence weed control in wheat and barley grain crops which comprises applying to dog fennel growing among said grain crops an aqueous dispersion of solid paraffin wax particles about 0.5 to 100 microns in size containing 0.16 to 5 parts by weight of a herbicidal ester of halogenated phenoxy alkanoic acid per part by weight of the wax in which the said ester is dissolved with a small amount of a wax soluble dispersing agent, said alkanoic acid being selected from the group of acetic and propionic acids and the ester being derived by esterification of the acid by a saturated alcohol of 6 to 8 carbon atoms, said solid particles being free of absorbed water, the resulting aqueous dispersion being applied at a rate of about ½ to 1 pound of active herbicide in 40 gallons of spray liquid by acre to kill said dog fennel selectively.

References Cited by the Examiner
UNITED STATES PATENTS

| | | | |
|---|---|---|---|
| 2,248,400 | 7/1941 | Avery | 71—2.6 X |
| 2,284,970 | 6/1942 | Avery | 71—2.6 X |
| 2,580,653 | 1/1952 | Bridgeman | 71—2.6 |
| 3,154,402 | 10/1964 | Salvesen et al. | 71—2.7 |

OTHER REFERENCES

Frear, Chemistry of the Pesticides, Third Edition, D. Van Nostrand Company, Inc., New York, 1955, pages 374 and 375.

LEWIS GOTTS, *Primary Examiner.*

JAMES O. THOMAS, JULIAN S. LEVITT, *Examiners.*